US012800883B2

(12) United States Patent
Yang et al.

(10) Patent No.: US 12,800,883 B2
(45) Date of Patent: Nov. 17, 2026

(54) CAMERA OPTICAL LENS

(71) Applicant: AAC OPTICS (CHANGZHOU) CO., LTD., Changzhou (CN)

(72) Inventors: Ke Yang, Changzhou (CN); Shunda Zhou, Changzhou (CN)

(73) Assignee: AAC OPTICS (CHANGZHOU) CO., LTD., Changzhou (CN)

( * ) Notice: Subject to any disclaimer, the term of this patent is extended or adjusted under 35 U.S.C. 154(b) by 163 days.

(21) Appl. No.: 19/001,540

(22) Filed: Dec. 25, 2024

(65) Prior Publication Data

US 2026/0009979 A1 Jan. 8, 2026

Related U.S. Application Data

(63) Continuation of application No. PCT/CN2024/103513, filed on Jul. 4, 2024.

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
USPC .......................................................... 359/708
See application file for complete search history.

(56) References Cited

U.S. PATENT DOCUMENTS

| | | | | |
|---|---|---|---|---|
| 12,072,554 | B2 * | 8/2024 | Chae | G02B 9/64 |
| 2020/0301111 | A1 * | 9/2020 | Chen | G02B 13/04 |
| 2021/0072504 | A1 * | 3/2021 | Yoo | G02B 13/004 |
| 2025/0085511 | A1 * | 3/2025 | Son | G02B 13/0045 |
| 2025/0327998 | A1 * | 10/2025 | Kwon | G02B 13/0045 |

* cited by examiner

*Primary Examiner* — Lin Ye
(74) *Attorney, Agent, or Firm* — Wersch Law Group

(57) ABSTRACT

The present disclosure discloses a camera optical lens including seven lenes. From an object-side to an-image side, the camera optical lens includes: a first lens having a negative refractive power; a second lens having a negative refractive power; a third lens having a positive refractive power; a fourth lens having a positive refractive power; a fifth lens having a positive refractive power; a sixth lens having a negative refractive power; a seventh lens having a positive refractive power; wherein the camera lens satisfies the following conditions: $-1.30 \le f1/f \le 1.00$; $0.02 \le d4/TTL \le 0.06$; $n2 \ge 1.70$; $0.10 \le BFL/TTL \le 0.30$. The camera optical lens can meet design requirements of large aperture and wide angle.

12 Claims, 10 Drawing Sheets

CAMERA OPTICAL LENS

CROSS REFERENCE TO RELATED APPLICATIONS

The present application is a continuation of PCT Patent Application No. PCT/CN2024/103513, entitled "CAMERA OPTICAL LENS," filed Jul. 4, 2024, which is incorporated by reference herein in its entirety.

TECHNICAL FIELD

The present disclosure relates to the field of optical lens, in particular to a camera optical lens suitable for handheld devices, such as smart phones and digital cameras, and camera devices such as monitors, vehicle-mounted lens, and PC lens.

BACKGROUND

With the rise of various smart devices in recent years, the demand for miniaturized camera optical lenses is increasing, and due to the reduction of the pixel size of light-sensitive devices, coupled with the development trend of electronic products with good functions, thin, lightweight, and portable appearance, miniaturized camera optical lenses with good imaging quality have become the mainstream of the current market. In order to obtain a better image quality, a multi-piece lens structure is mostly equipped. Moreover, with the development of technology and the increase of diversified needs of users, the pixel area of light-sensitive devices is constantly shrinking, and the requirements of the system for imaging quality are constantly improving, a camera optical lens with seven lenses gradually appears in the lens design. There is an urgent need for camera optical lenses with good optical characteristics, small size, and fully corrected aberrations.

SUMMARY

In response to the foregoing technical problems, an object of embodiments of the present disclosure is to provide a camera optical lens, which can have good optical performance, and can meet the design requirements of large aperture and wide angle.

To resolve the foregoing technical problems, the present disclosure provides a camera optical lens, comprising seven lenses, from an object side to an image side, the seven lenses in sequence being: a first lens having a negative refractive power; a second lens having a negative refractive power; a third lens having a positive refractive power; a fourth lens having a positive refractive power; a fifth lens having a positive refractive power; a sixth lens having a negative refractive power; a seventh lens having a positive refractive power; wherein the camera lens satisfies the following conditions: $-1.30 \leq f1/f \leq 1.00$; $0.02 \leq d4/TTL \leq 0.06$; $n2 \geq 1.70$; $0.10 \leq BFL/TTL \leq 0.30$; where, f represents a focal length of the camera optical lens; f1 represents a focal length of the first lens; d4 represents a distance on axis between an image side surface of the second lens and an object side surface of the third lens; TTL represents a total track length of the camera optical lens; nd2 represents a refractive index of the second lens; BFL represents a distance on axis between an image side surface of the seventh lens and an image surface.

As an improvement, wherein the fifth lens is provided glued to the sixth lens.

As an improvement, wherein the camera optical lens further satisfies the following conditions: $v5 - v6 \geq 35.00$; where, v5 represents an abbe number of the fifth lens; v6 represents an abbe number of the sixth lens.

As an improvement, wherein the camera optical lens further satisfies the following conditions: $-8.00 \leq R14/f \leq 2.00$; where, R14 represents a central curvature radius of the image side surface of the seventh lens.

As an improvement, wherein an image side surface of the first lens is concave in a paraxial region; and the camera optical lens further satisfies the following conditions: $0.47 \leq (R1+R2)/(R1-R2) \leq 1.81$; $0.01 \leq d1/TTL \leq 0.14$; where, R1 represents a central curvature radius of the object side surface of the first lens; R2 represents a central curvature radius of the image side surface of the first lens; d1 represents a thickness on-axis of the first lens.

As an improvement, wherein an object side surface of the second lens is concave in a paraxial region, an image side surface of the second lens is convex in a paraxial region; and the camera optical lens further satisfies the following conditions: $-6.56 \leq f2/f \leq -1.72$; $-2.84 \leq (R3+R4)/(R3-R4) \leq -0.83$; $0.03 \leq d3/TTL \leq 0.09$; where, f2 represents a focal length of the second lens; R3 represents a central curvature radius of the object side surface of the second lens; R4 represents a central curvature radius of the image side surface of the second lens; d3 represents a thickness on-axis of the second lens.

As an improvement, wherein an object side surface of the third lens is convex in a paraxial region, an image side surface of the third lens is convex in a paraxial region; and the camera optical lens further satisfies the following conditions: $0.70 \leq f3/f \leq 2.37$; $0.01 \leq (R5+R6)/(R5-R6) \leq 0.23$; $0.03 \leq d5/TTL \leq 0.16$; where, f3 represents a focal length of the third lens; R5 represents a central curvature radius of the object side surface of the third lens; R6 represents a central curvature radius of the image side surface of the third lens; d5 represents a thickness on-axis of the third lens.

As an improvement, wherein an object side surface of the fourth lens is convex in a paraxial region, an image side surface of the fourth lens is convex in a paraxial region; and the camera optical lens further satisfies the following conditions: $1.30 \leq f4/f \leq 4.28$; $0.20 \leq (R7+R8)/(R7-R8) \leq 0.79$; $0.02 \leq d7/TTL \leq 0.13$; where, f4 represents a focal length of the fourth lens; R7 represents a central curvature radius of the object side surface of the fourth lens; R8 represents a central curvature radius of the image side surface of the fourth lens; d7 represents a thickness on-axis of the fourth lens.

As an improvement, wherein an object side surface of the fifth lens is convex in a paraxial region, an image side surface of the fifth lens is convex in a paraxial region; and the camera optical lens further satisfies the following conditions: $0.49 \leq f5/f \leq 1.92$; $0.13 \leq (R9+R10)/(R9-R10) \leq 0.45$; $0.07 \leq d9/TTL \leq 0.23$; where, f5 represents a focal length of the fifth lens; R9 represents a central curvature radius of the object side surface of the fifth lens; R10 represents a central curvature radius of the image side surface of the fifth lens; d9 represents a thickness on-axis of the fifth lens.

As an improvement, wherein an object side surface of the sixth lens is concave in a paraxial region, an image side surface of the sixth lens is concave in a paraxial region; and the camera optical lens further satisfies the following conditions: $-2.18 \leq f6/f \leq 0.62$; $-1.77 \leq (R11+R12)/(R11-R12) \leq -0.51$; $0.01 \leq d11/TTL \leq 0.08$; where, f6 represents a focal length of the sixth lens; R11 represents a central curvature radius of the object side surface of the sixth lens; R12 represents a central curvature radius of the image side surface of the sixth lens; d11 represents a thickness on-axis of the sixth lens.

As an improvement, wherein an image side surface of the seventh lens is convex in a paraxial region; and the camera optical lens further satisfies the following conditions: $1.94 \leq f7/f \leq 21.57$; $0.24 \leq (R13+R14)/(R13-R14) \leq 1.97$; $0.05 \leq d13/TTL \leq 0.28$; where, f7 represents a focal length of the seventh lens; R13 represents a central curvature radius of the object side surface of the seventh lens; R14 represents a central curvature radius of the image side surface of the seventh lens; d13 represents a thickness on-axis of the seventh lens.

As an improvement, wherein the first lens is made of glass material; the second lens is made of glass material; the third lens is made of glass material; the fourth lens is made of glass material; the fifth lens is made of glass material; the sixth lens is made of glass material; the seventh lens is made of glass material.

The beneficial effect of the present disclosure are as follows. The camera optical lens designed according to the present disclosure has excellent optical characteristics, and the camera optical lens has the characteristics of large aperture and wide angle. The camera optical lens is particularly suitable for in-vehicle lenses and WEB camera lenses, which includes camera elements such as CCD (Charge-Coupled Device), CMOS (Complementary Metal-Oxide-Semiconductor) and other camera elements for high pixels.

BRIEF DESCRIPTION OF THE DRAWINGS

In order to more clearly illustrate the technical solutions in the embodiments of the present disclosure, the accompanying drawings to be used in the description in the embodiments will be briefly introduced hereinafter, and the following is a brief introduction of the drawings required in the description of the embodiments. It is obvious that the accompanying drawings in the description hereinafter are only some of the embodiments of the present disclosure, and that for a person having ordinary skill in the art, other accompanying drawings can also be obtained according to these drawings without creative labor.

DETAILED DESCRIPTION OF THE EMBODIMENTS

Figure 1:
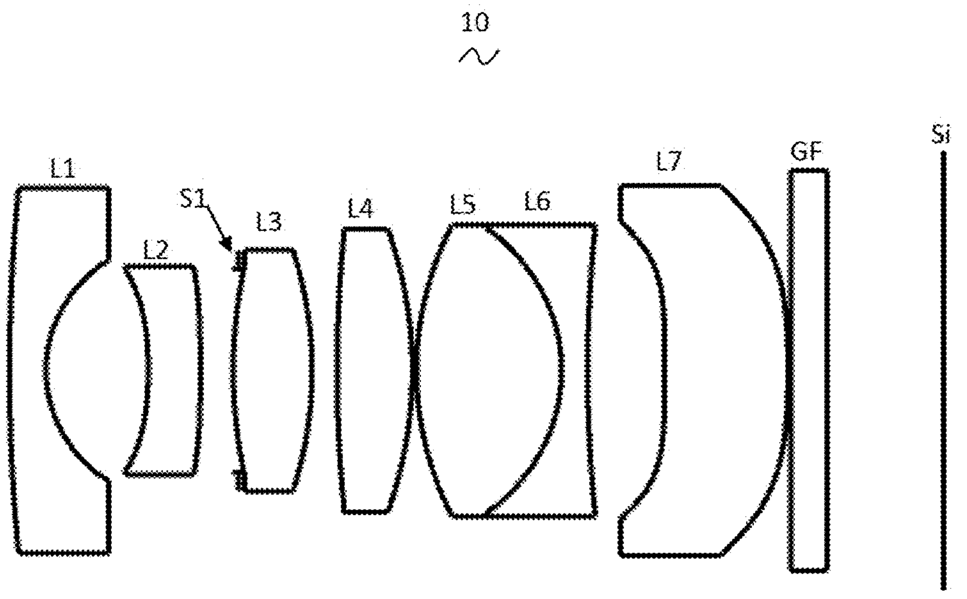
FIG. 1 is a schematic diagram of a camera optical lens in accordance with a first embodiment of the present disclosure.

To make the technical problems to be solved, technical solutions and beneficial effects of the present disclosure more apparent, the present disclosure is described in further detail together with the figure and the embodiments. It should be understood the specific embodiments described hereby is only to explain the present disclosure, not intended to limit the disclosure. It is understandable to a person having ordinary skill in the art that, in various embodiments of the disclosure, many technical details are proposed to enable the reader to better understand the present disclosure. However, even without the technical details and various variations and modifications based on the following embodiments, the technical solution claimed to be protected by the present disclosure can be realized.

Referring to FIG. 1, FIG. 5, FIG. 9 and FIG. 13, the present disclosure provides a camera optical lens 10, 20, 30, and 40. FIG. 1, FIG. 5, FIG. 9 and FIG. 13 respectively shows the camera optical lens 10, the camera optical lens 20, the camera optical lens 30, and the camera optical lens 40. The camera optical lens includes seven lenses in total. Specifically, from the object side to the image side, the camera optical lens includes in sequence: a first lens L1, a second lens L2, an aperture S1, a third lens L3, a fourth lens L4, a fifth lens L5, a sixth lens L6, and a seventh lens L7. Optical elements like an optical filter GF may be arranged between the seventh lens L7 and the image surface Si.

The first lens L1 is made of glass material. The second lens L2 is made of glass material. The third lens L3 is made of glass material. The fourth lens L4 is made of glass material. The fifth lens L5 is made of glass material. The sixth lens L6 is made of glass material. The seventh lens L7 is made of glass material. In other optional embodiments, the respective lens of the camera optical lens may also be made of other materials.

The first lens L1 has a negative refractive power. The second lens L2 has a negative refractive power. The third lens L3 has a positive refractive power. The fourth lens L4 has a positive refractive power. The fifth lens L5 has a positive refractive power. The sixth lens L6 has a negative refractive power. The seventh lens L7 has a positive refractive power. In other optional embodiments, the respective lens of the camera optical lens may also have other refractive power.

The object side surface and the image side of the first lens L1 are both spherical surfaces. The object side surface and the image side of the third lens L3 are both spherical surfaces. The object side surface and the image side of the fourth lens L4 are both spherical surfaces. The object side surface and the image side of the fifth lens L5 are both spherical surfaces. The object side surface and the image side of the second lens L2 are both aspheric surfaces. The object side surface and the image side of the seventh lens L7 are both aspheric surfaces.

The focal length of the camera optical lens is defined as f, and the focal length of the first lens L1 is defined as f1. The camera optical lens 10 satisfies the following condition: $-1.30 \le f1/f \le 1.00$, which fixes the ratio between the focal length f1 of the first lens L1 and the total focal length f of the camera optical lens. By allocating the optical focal length of the system reasonably, the amount of the field curvature of the camera optical lens can be effectively balanced, so that the amount of the field curvature offset of the center field of view is less than 0.01 mm.

The distance on axis between the image side surface of the second lens L2 and the object side surface of the third lens L3 is defined as d4. The total track length of the camera optical lens is defined as TTL. The following condition should be satisfied: $0.02 \le d4/TTL \le 0.06$, which fixes the ratio between the distance on axis d3 between the first lens L1 and the second lens L2 near to the aperture and the total track length TTL. When the ratio is higher than the lower limit, light near the aperture can be smoothly translated and the lateral color can be corrected to ensure the imaging quality. When the ratio is lower than the upper limit, it is beneficial to control the total track length TTL of the camera optical lens.

The refractive index of the second lens L2 is defined as n2, which satisfies the following condition: $n2 \ge 1.70$. High refractive index material is preferred for the front lens, which is conducive to the reduction of the front aperture and the improvement of imaging quality.

The distance on axis from the image side surface of the seventh lens L7 to the image surface is defined as BFL, which satisfies the following condition: $0.10 \le BFL/TTL \le 0.30$. On the basis of realizing miniaturization, the length of the rear focus is conducive to the assembly of the module, the total track length TTL is short, the structure is compact, the sensitivity of the lens to MTF is reduced, the production yield is improved, and the production cost is reduced.

In the case of satisfying the above conditions, the camera optical lens 10, 20, 30 and 40 has good optical performance and can meet the design requirements of a large aperture and wide angle. Based on the characteristics of the camera optical lens 10, 20, 30 and 40, the camera optical lens 10, 20, 30 and 40 is particularly suitable for in-vehicle lenses and WEB camera lenses, which includes camera elements such as CCD and CMOS for high pixel.

Based on the above conditions and the functions that can be achieved, the characteristics of each lens are further refined as follows.

The fifth lens L5 and the sixth lens L6 are glued together. The fifth lens L5 is provided glued to the sixth lens L6. The overall volume of the camera optical lens can be reduced by gluing setting. In addition, the fifth lens L5 and the sixth lens L6 are formed to be an overall structure by gluing setting, and the installation of the fifth lens L5 and the sixth lens L6 can be completed by a single placement when assembling the optical module.

The abbe number of the fifth lens L5 is defined as v5. The abbe number of the sixth lens L6 is defined as v6. The following condition should be satisfied: $v5-v6 \ge 35.00$, which fixed the difference between the abbe number v5 of the fifth lens 5 and the able number v6 of the sixth lens L6 that are glued together. When the condition is satisfied, material properties can be effectively assigned, the chromatic aberration (i.e., lateral color) can be effectively corrected, so that the lateral color $|LC|$ is less than or equal to 5 μm.

The central curvature radius of the image side surface of the seventh lens L7 is defined as R14. The following condition should be satisfied: $-8.00 \le R14/f \le 2.00$, by which, the shape of the seventh lens L7 from which the light is emitted is fixed. When the condition is satisfied, the degree of deflection of the light passing through the lens can be reduced and the chromatic aberration (i.e., lateral color) can be effectively corrected, so that the image quality can be improved.

The image side surface of the first lens L1 is concave in the paraxial region. The image side surface of the first lens L1 may also be provided with other concave and convex distributions.

The central curvature radius of the object side surface of the first lens L1 is defined as R1, and the central curvature radius of the image side surface of the first lens L1 is defined as R2. The following condition should be satisfied: $0.47 \le (R1+R2)/(R1-R2) \le 1.81$, by which, the shape of the first lens L1 is reasonably controlled, it is beneficial for efficiently correcting the spherical aberration of the system. Preferably, the following condition shall be satisfied, $0.75 \le (R1+R2)/(R1-R2) \le 1.45$.

The thickness on-axis of the first lens L1 is defined as d1. The following condition should be satisfied: $0.01 \le d1/TTL \le 0.14$. When the condition is satisfied, it is beneficial to control the thickness of the first lens L1 and make the light stable, so that the chromatic aberration can be controlled effectively. Preferably, the following condition shall be satisfied, $0.01 \le d1/TTL \le 0.11$.

The object side surface of the second lens L2 is concave in the paraxial region, and the image side surface of the second lens L2 is convex in the paraxial region. The object side surface of the second lens L2 may also be provided with other concave and convex distributions.

The focal length of the camera optical lens is defined as f, and the focal length of the second lens L2 is defined as f2. The following condition should be satisfied: $-6.56 \le f2/f \le 1.72$. By controlling the focal power of the second lens L2 in a reasonable range, it is beneficial for correcting the lateral color of the optical system (i.e., the camera optical lens 10). Preferably, the following condition shall be satisfied, $-4.10 \le f2/f \le 2.15$ The central curvature radius of the object side surface of the second lens L2 is defined as R3, and the central curvature radius of the image side surface of the second lens L2 is defined as R4. The following condition should be satisfied: $-2.84 \le (R3+R4)/(R3-R4) \le -0.83$, by which, the shape of the second lens L2 is reasonably controlled, it is beneficial for efficiently correcting the spherical aberration of the system by the second lens L2. Preferably, the following condition shall be satisfied, $-1.77 \le (R3+R4)/(R3-R4) \le 1.04$.

The thickness on axis of the second lens L2 is defined as d3, which satisfies the following condition: $0.03 \le d3/TTL \le 0.09$. When the condition is satisfied, by controlling the thickness of the second lens L2, the light can be stable, so that the chromatic aberration can be effectively controlled. Preferably, $0.04 \le d3/TTL \le 0.07$ shall be satisfied.

The object side surface of the third lens L3 is convex in the paraxial region, and the image side surface of the third lens L3 is convex in the paraxial region. The object side surface and the image side surface of the third lens L3 may also be provided with other concave and convex distributions.

The focal length of the third lens L3 is defined as f3. The following condition: $0.70 \le f3/f \le 2.37$ should be satisfied. By distributing the focal power of the fourth lens L4 appropriately, the camera optical lens can have better imaging quality and lower sensitivity. Preferably, the following condition shall be satisfied, $1.11 \le f3/f \le 1.90$.

The central curvature radius of the object side surface of the third lens L3 is defined as R5, and the central curvature radius of the image side surface of the third lens L3 is defined as R6. The following condition should be satisfied: $0.01 \le (R5+R6)/(R5-R6) \le 0.23$, which fixes the shape of the third lens L3. When the condition is satisfied, it is beneficial for correcting the aberration of the axis with the development of the lens to wide-angle. Preferably, the following condition shall be satisfied, $0.02 \le (R5+R6)/(R5-R6) \le 0.18$.

The thickness on-axis of the third lens L3 is defined as d5. The following condition should be satisfied: $0.03 \le d5/TTL \le 0.16$. When the condition is satisfied, by controlling the thickness of the third lens L3, the light can be stable, so that the chromatic aberration can be effectively controlled. Preferably, the following condition shall be satisfied, $0.05 \le d5/TTL \le 0.13$.

The object side surface of the fourth lens L4 is convex in the paraxial region, and the image side surface of the fourth lens L4 is convex in the paraxial region. The image side surface of the fourth lens L4 may also be provided with other concave and convex distributions.

The focal length of the fourth lens L4 is defined as f4. The following condition: $1.30 \le f4/f \le 4.28$ should be satisfied. By distributing the focal power of the fourth lens L4 appropriately, the camera optical lens can have better imaging quality and lower sensitivity. Preferably, the following condition shall be satisfied, $2.08 \le f4/f \le 3.43$.

The central curvature radius of the object side surface of the fourth lens L4 is defined as R7, and the central curvature radius of the image side surface of the fourth lens L4 is defined as R8. The following condition should be satisfied: $0.20 \le (R7+R8)/(R7-R8) \le 0.79$, which fixes the shape of the fourth lens L4. When the condition is satisfied, it is beneficial for the light transition smoothly and improves the image quality. Preferably, the following condition shall be satisfied, $0.31 \le (R7+R8)/(R7-R8) \le 0.63$.

The thickness on-axis of the fourth lens L4 is defined as d7. The following condition should be satisfied: $0.02 \le d7/TTL \le 0.13$. When the condition is satisfied, by controlling the thickness of the fourth lens L4, the light can be stable, so that the chromatic aberration can be effectively controlled. Preferably, the following condition shall be satisfied, $0.03 \le d7/TTL \le 0.11$.

The object side surface of the fifth lens L5 is convex in the paraxial region, and the image side surface of the fifth lens L5 is convex in the paraxial region. The object side surface and the image side surface of the fifth lens L5 may also be provided with other concave and convex distributions.

The focal length of the fifth lens L5 is defined as f5. The following condition should be satisfied: $0.49 \le f5/f \le 1.92$, which restricts the fifth lens L5. The restriction of the fifth lens L5 can effectively make the light angle of the camera optical lens smooth and reduce the tolerance sensitivity. Preferably, the following condition shall be satisfied, $0.79 \le f5/f \le 1.54$.

The central curvature radius of the object side surface of the fifth lens L5 is defined as R9, and the central curvature radius of the image side surface of the fifth lens L5 is defined as R10. The following condition should be satisfied: $0.13 \le (R9+R10)/(R9-R10) \le 0.45$, which fixes the shape of the fifth lens L5. When the condition is satisfied, it is beneficial for correcting the aberration and the distortion of the camera optical lens. Preferably, the following condition shall be satisfied, $0.21 \le (R9+R10)/(R9-R10) \le 0.36$.

The thickness on-axis of the fifth lens L5 is defined as d9. The following condition should be satisfied: $0.07 \le d9/TTL \le 0.23$. When the condition is satisfied, by controlling the thickness of the fifth lens L5, the light can be stable, so that the chromatic aberration can be effectively controlled. Preferably, the following condition shall be satisfied, $0.12 \le d9/TTL \le 0.19$.

The object side surface of the sixth lens L6 is concave in the paraxial region, and the image side surface of the sixth lens L6 is concave in the paraxial region. The object side surface and the image side surface of the sixth lens L6 may also be provided with other concave and convex distributions.

The focal length of the sixth lens L6 is defined as f6. The following condition should be satisfied: $-2.18 \le f6/f \le 0.62$, which restricts the sixth lens L6. The restriction of the sixth lens L6 can effectively make the light angle of the camera optical lens smooth and reduce the tolerance sensitivity. Preferably, the following condition shall be satisfied, $-1.36 \le f6/f \le -0.77$.

The central curvature radius of the object side surface of the sixth lens L6 is defined as R11, and the central curvature radius of the image side surface of the sixth lens L6 is defined as R12. The following condition should be satisfied: $-1.77 \le (R11+R12)/(R11-R12) \le -0.51$, which fixes the shape of the sixth lens L6. When the condition is satisfied, it is beneficial for correcting the aberration of the image of the off axis drawing angle, among other things, with the development of wide angle. Preferably, the following condition shall be satisfied, $-1.10 \le (R11+R12)/(R11-R12) \le -0.64$.

The thickness on-axis of the sixth lens L6 is defined as d9. The following condition should be satisfied: $0.01 \le d11/TTL \le 0.08$. When the condition is satisfied, by controlling the thickness of the sixth lens L6, the light can be stable, so that the chromatic aberration can be effectively controlled. Preferably, the following condition shall be satisfied, $0.02 \le d11/TTL \le 0.06$.

The image side surface of the seventh lens L7 is convex in the paraxial region. The image side surface of the seventh lens L7 may also be provided with other concave and convex distributions.

The focal length of the seventh lens L7 is defined as f7. The following condition should be satisfied: $1.94 \le f7/f \le 21.57$, which fixes the ratio between the focal length f7 of the last lens (i.e., the seventh lens L7) and the focal length f of the camera optical lens. By allocating the focal length of the system, it is beneficial for receiving light and ensuring light throughput. Preferably, the following condition shall be satisfied, $3.10 \le f7/f \le 17.26$.

The central curvature radius of the object side surface of the seventh lens L7 is defined as R13, and the central curvature radius of the image side surface of the seventh lens L7 is defined as R14. The following condition should be satisfied: $0.24 \le (R13+R14)/(R13-R14) \le 1.97$, which fixes the shape of the seventh lens L7. When the condition is satisfied, it is beneficial for correcting the aberration of the image of the off axis drawing angle, among other things, with the development of wide angle. Preferably, the following condition shall be satisfied, 0.39≤(R13+R14)/(R13−R14)≤1.58.

The thickness on-axis of the seventh lens L7 is defined as d13. The following condition should be satisfied: 0.05≤d13/TTL≤0.28. When the condition is satisfied, by controlling the thickness of the seventh lens L7, the light can be stable, so that the chromatic aberration can be effectively controlled. Preferably, the following condition shall be satisfied, 0.08≤d13/TTL≤0.23.

The FOV (field of view) of the camera optical lens is greater than or equal to 130.00°, thereby achieving a wide-angle of the camera optical lens.

The F number of the camera optical lens is defined as FNO. The camera optical lens satisfies the following condition: FNO≤2.05, which makes the camera optical lens have a large aperture and a good optical performance.

The camera optical lens of the present disclosure will be described below by way of examples. The various symbols recorded in each example are shown below. The focal length, distance on-axis, center curvature radius, and thickness on-axis are all in units of mm.

TTL: Total track length (the distance from the object-side surface of the first lens L1 to the image surface Si of the camera optical lens along the optical axis), and the unit of TTL is mm.

Aperture value FNO: a ratio of the effective focal length of the camera optical lens to the entrance pupil diameter of the camera optical lens.

The technical scheme of the present disclosure is specifically described in four embodiments, and at the same time, a contrast embodiment is provided as a reference, and the technical effect of the present disclosure cannot be realized beyond the scope of the above conditions.

First Embodiment

Table 1 and table 2 show the design data of the camera optical lens 10 in the first embodiment of the present disclosure. FIG. 1 shows a schematic diagram of a structure of a camera optical lens 10 in the first embodiment of the present disclosure.

The object side surface of the first lens L1 is convex in the paraxial region. The object side surface of the seventh lens L7 is concave in the paraxial region.

TABLE 1

| | R | d | | nd | | vd | |
|---|---|---|---|---|---|---|---|
| S1 | ∞ | d0= | −4.408 | | | | |
| R1 | 40.000 | d1= | 0.700 | nd1 | 1.5891 | v1 | 61.25 |
| R2 | 2.718 | d2= | 1.971 | | | | |
| R3 | −8.012 | d3= | 1.003 | nd2 | 1.8100 | v2 | 41.00 |
| R4 | −55.631 | d4= | 0.634 | | | | |
| R5 | 10.737 | d5= | 1.517 | nd3 | 1.7725 | v3 | 49.61 |
| R6 | −8.392 | d6= | 0.480 | | | | |
| R7 | 28.930 | d7= | 1.450 | nd4 | 1.5891 | v4 | 61.25 |
| R8 | −9.045 | d8= | 0.080 | | | | |
| R9 | 6.796 | d9= | 2.806 | nd5 | 1.5928 | v5 | 68.35 |
| R10 | −3.639 | d10= | 0.000 | | | | |
| R11 | −3.639 | d11= | 0.500 | nd6 | 1.7847 | v6 | 25.72 |
| R12 | 29.397 | d12= | 1.486 | | | | |
| R13 | −181.630 | d13= | 2.373 | nd7 | 1.5891 | v7 | 61.16 |
| R14 | −18.596 | d14= | 0.055 | | | | |
| R15 | ∞ | d15= | 0.700 | ndg | 1.5168 | vg | 64.21 |
| R16 | ∞ | d16= | 2.245 | | | | |

In which, the meaning of the various symbols is as follows.

S1: Aperture;

R: The curvature radius at the center of the optical surface;

R1: The central curvature radius of the object side surface of the first lens L1;

R2: The central curvature radius of the image side surface of the first lens L1;

R3: The central curvature radius of the object side surface of the second lens L2;

R4: The central curvature radius of the image side surface of the second lens L2;

R5: The central curvature radius of the object side surface of the third lens L3;

R6: The central curvature radius of the image side surface of the third lens L3;

R7: The central curvature radius of the object side surface of the fourth lens L4;

R8: The central curvature radius of the image side surface of the fourth lens L4;

R9: The central curvature radius of the object side surface of the fifth lens L5;

R10: The central curvature radius of the image side surface of the fifth lens L5;

R11: The central curvature radius of the object side surface of the sixth lens L6;

R12: The central curvature radius of the image side surface of the sixth lens L6;

R13: The central curvature radius of the object side surface of the seventh lens L7;

R14: The central curvature radius of the image side surface of the seventh lens L7;

R15: The central curvature radius of the object side surface of the optical filter GF;

R16: The center curvature radius of the image side surface of the optical filter GF;

d: The thickness on-axis of the lens, and the distance on-axis between the lenses;

d0: The distance on-axis from the aperture S1 to the object side surface of the first lens L1;

d1: The thickness on-axis of the first lens L1;

d2: The distance on-axis from the image side surface of the first lens L1 to the object side surface of the second lens L2;

d3: The thickness on-axis of the second lens L2;

d4: The distance on-axis from the image side surface of the second lens L2 and the object side surface of the third lens L3;

d5: The thickness on-axis of the third lens L3;

d6: The distance on-axis from the image side surface of the third lens L3 to the object side surface of the fourth lens L4;

d7: The thickness on-axis off the fourth lens L4;

d8: The distance on-axis from the image side surface of the fourth lens L4 to the object side surface of the fifth lens L5;

d9: The thickness on-axis of the fifth lens L5;

d10: The distance on-axis from the image side surface of the fifth lens L5 to the object side surface of the sixth lens L6;

d11: The thickness on-axis of the sixth lens L6;

d12: The distance on-axis from the image side surface of the sixth lens L6 to the object side surface of the seventh lens L7;

d13: The thickness on-axis of the seventh lens L7;

d14: The distance on-axis from the image side surface of the seventh lens L7 and the object side surface of the optical filter GF;

d15: The thickness on-axis of the optical filter GF;

d16: The distance on-axis from the image side surface of the optical filter GF to the image surface Si;

nd: The refractive power of d line (d line is green light with a wavelength of 550 nm);

nd1: The refractive power of the d line of the first lens L1;

nd2: The refractive power of the d line of the second lens L2;

nd3: The refractive power of the d line of the third lens L3;

nd4: The refractive power of the d line of the fourth lens L4;

nd5: The refractive power of the d line of the fifth lens L5;

nd6: The refractive power of the d line of the sixth lens L6;

nd7: The refractive power of the d line of the seventh lens L7;

ndg: The refractive power of d line of the optical filter GF;

vd: The abbe number;

v1: The abbe number of the first lens L1;

v2: The abbe number of the second lens L2;

v3: The abbe number of the third lens L3;

v4: The abbe number of the fourth lens L4;

v5: The abbe number of the fifth lens L5;

v6: The abbe number of the sixth lens L6;

v7: The abbe number of the seventh lens L7;

vg: The abbe number of the optical filter GF.

Table 2 shows aspherical surface data of the second lens L2 and the seventh lens L7 of the camera optical lens 10 in in the first embodiment of the present disclosure.

TABLE 2

| | Conic coefficients | Aspheric surface coefficients | | | | |
|---|---|---|---|---|---|---|
| | k | A4 | A6 | A8 | A10 | A12 |
| R3 | −1.1731E+00 | −1.0015E−02 | −9.1127E−04 | 1.4537E−03 | −1.1263E−03 | 5.3196E−04 |
| R4 | 7.8331E−01 | −6.1139E−03 | −8.3667E−04 | 1.8657E−03 | −1.4834E−03 | 7.1218E−04 |
| R13 | 2.9572E+02 | −8.5815E−03 | 4.2307E−04 | −4.2805E−04 | 1.5973E−04 | −3.5852E−05 |
| R14 | 7.5303E+00 | −5.1172E−03 | 2.2229E−04 | −1.7534E−04 | 7.3433E−05 | −1.7955E−05 |

| | Conic coefficients | Aspheric surface coefficients | | | | |
|---|---|---|---|---|---|---|
| | k | A14 | A16 | A18 | A20 | A22 |
| R3 | −1.1731E+00 | −1.5055E−04 | 2.3780E−05 | −1.7757E−06 | 3.7314E−08 | / |
| R4 | 7.8331E−01 | −2.0774E−04 | 3.5556E−05 | −3.2405E−06 | 1.1954E−07 | / |
| R13 | 2.9572E+02 | 4.7089E−06 | −3.4922E−07 | 1.3588E−08 | −2.0815E−10 | / |
| R14 | 7.5303E+00 | 2.7517E−06 | −2.6737E−07 | 1.5989E−08 | −5.3614E−10 | 7.7115E−12 |

For convenience, the aspheric of each lens is used the aspherical surfaces shown in formula (1) below. However, the present disclosure is not limited to the aspheric polynomial form represented by the formula (1).

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20}+A22r^{22} \quad (1)$$

here k is the cone coefficient, A4, A6, A8, A10, A12, A14, A16, A18, A20, and A22 are aspheric coefficients, c is the curvature at the center of the optical surface, r is the vertical distance between the point on the aspheric curve and the optical axis, and z is the aspherical depth (i.e., the vertical distance between a point on the aspherical surface r from the optical axis and a section tangent to the vertex on the aspherical optical axis).

Figure 2:
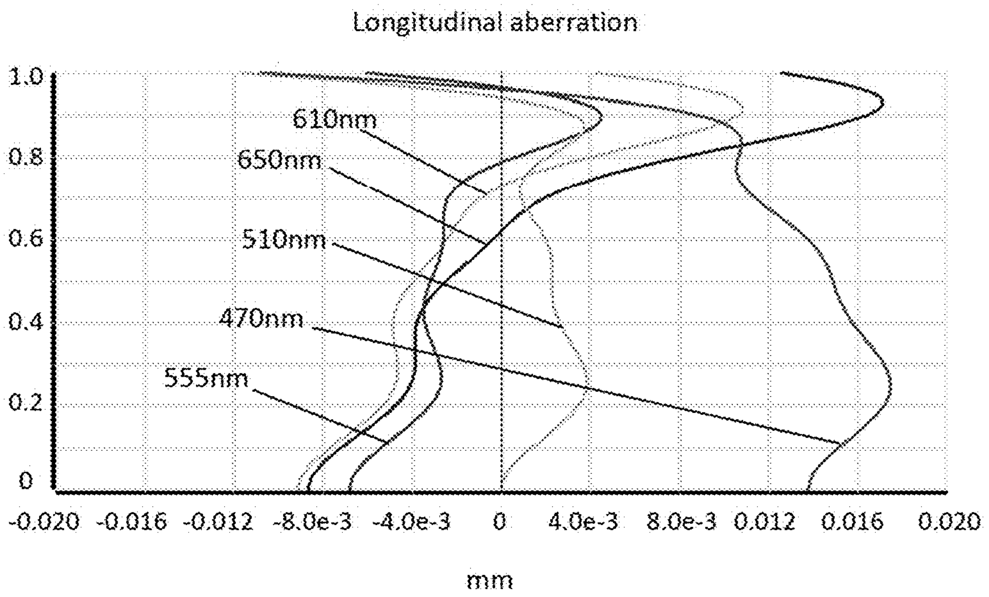
FIG. 2 shows the longitudinal aberration of the camera optical lens shown in FIG. 1.
Figure 3:
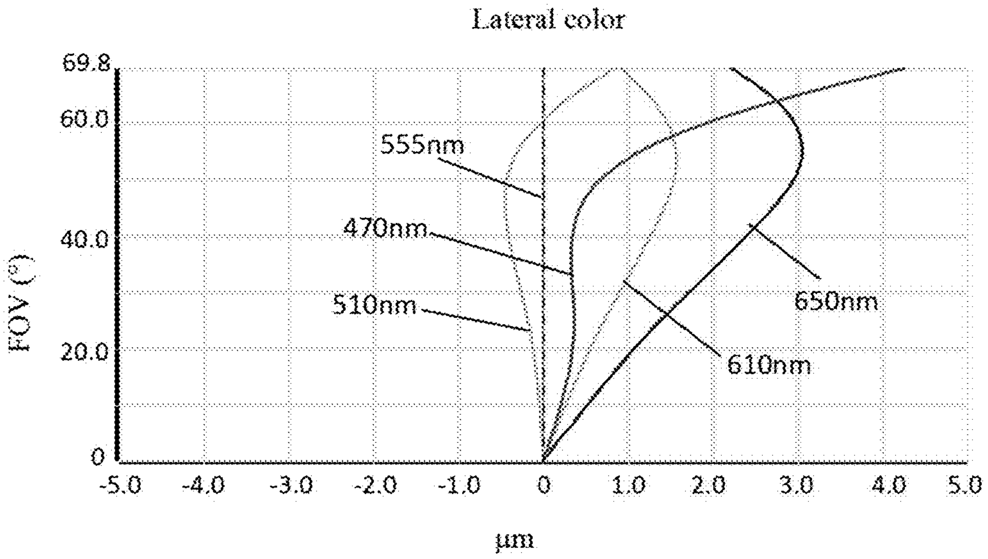
FIG. 3 shows the lateral color of the camera optical lens shown in FIG. 1.
Figure 4:
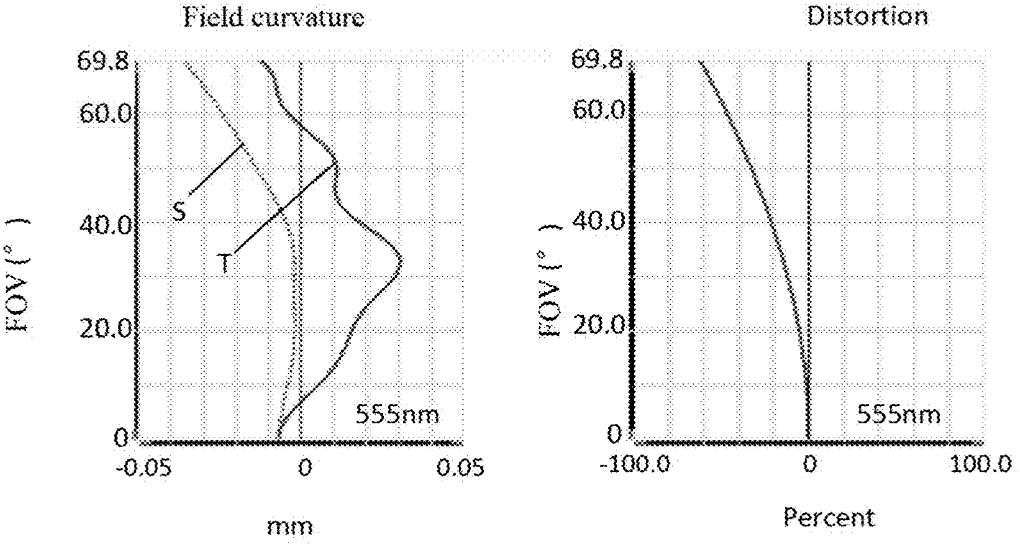
FIG. 4 presents a schematic diagram of the field curvature and distortion of the camera optical lens shown in FIG. 1.

FIG. 2 and FIG. 3 respectively show the longitudinal aberration and lateral color schematic diagrams after light with wavelengths of 650 nm, 610 nm, 555 nm, 510 nm, and 470 nm passes through the camera optical lens 10 in the first embodiment. FIG. 4 shows the schematic diagrams of the field curvature and distortion after light with a wavelength of 555 nm passes through the camera optical lens 10 in the first embodiment. The field curvature S in FIG. 4 is a field curvature in the sagittal direction, and T is the field curvature in the meridian direction.

In this embodiment, the pupil entering diameter (ENPD) of the camera optical lens 10 is 2.11 mm, the image height (IH) of 1.0H is 4.450 mm, and the field of view (FOV) in the diagonal direction is 139.60°. The camera optical lens 10 can meet the design requirements of large aperture and wide-angle, and chromatic aberrations on-axis and chromatic aberrations off-axis are adequately corrected. And the camera optical lens 10 has excellent optical characteristics.

Second Embodiment

The meaning of symbols in the second embodiment is the same as that in the first embodiment.

Figure 5:
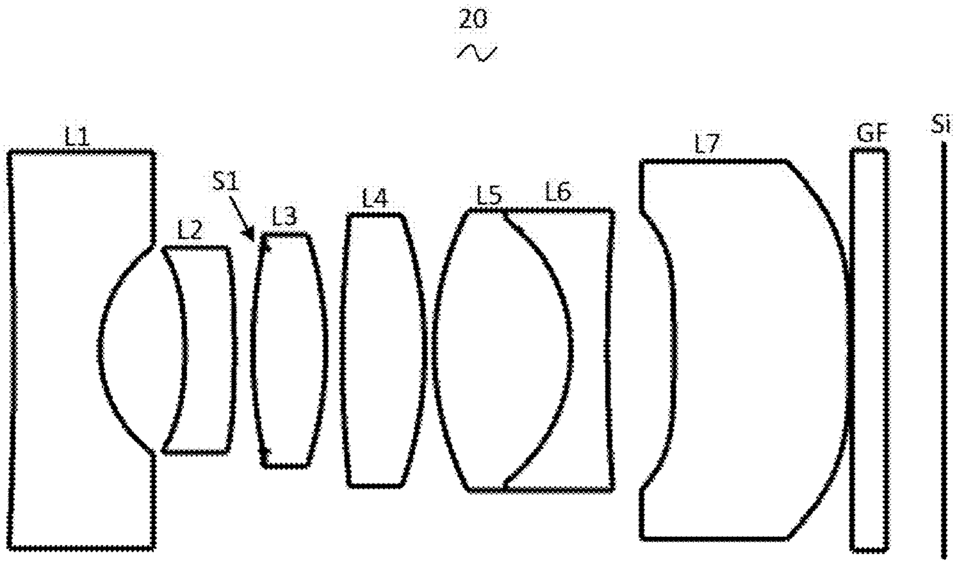
FIG. 5 is a schematic diagram of t a camera optical lens in accordance with a second embodiment of the present disclosure.

FIG. 5 shows a schematic diagram of a structure of a camera optical lens 20 in the second embodiment of the present disclosure.

The object side surface of the first lens L1 is concave in the paraxial region. The object side surface of the seventh lens L7 is concave in the paraxial region.

Table 3 and Table 4 show design data of the camera optical lens 20 in the second embodiment of the present disclosure.

TABLE 3

| | R | | d | | nd | | vd |
|---|---|---|---|---|---|---|---|
| S1 | ∞ | d0= | −5.177 | | | | |
| R1 | −93.673 | d1= | 1.785 | nd1 | 1.5891 | v1 | 61.25 |
| R2 | 2.740 | d2= | 1.753 | | | | |
| R3 | −8.561 | d3= | 1.019 | nd2 | 1.7015 | v2 | 41.14 |
| R4 | −52.455 | d4= | 0.385 | | | | |
| R5 | 10.997 | d5= | 1.504 | nd3 | 1.7725 | v3 | 49.61 |
| R6 | −8.089 | d6= | 0.339 | | | | |

TABLE 3-continued

| | R | d | | nd | | vd | |
|---|---|---|---|---|---|---|---|
| R7 | 26.666 | d7= | 1.705 | nd4 | 1.5891 | v4 | 61.25 |
| R8 | −8.998 | d8= | 0.198 | | | | |
| R9 | 6.725 | d9= | 2.834 | nd5 | 1.5928 | v5 | 68.35 |
| R10 | −3.602 | d10= | 0.000 | | | | |
| R11 | −3.602 | d11= | 0.756 | nd6 | 1.7847 | v6 | 25.72 |
| R12 | 38.658 | d12= | 1.371 | | | | |
| R13 | −577.442 | d13= | 3.632 | nd7 | 1.5891 | v7 | 61.16 |
| R14 | −35.721 | d14= | 0.050 | | | | |
| R15 | ∞ | d15= | 0.700 | ndg | 1.5168 | vg | 64.21 |
| R16 | ∞ | d16= | 1.198 | | | | |

Table 4 shows aspherical surface data of the second lens L2 and the seventh lens L7 of the camera optical lens 20 in in the second embodiment of the present disclosure.

TABLE 4

| | Conic coefficients | Aspheric surface coefficients | | | | |
|---|---|---|---|---|---|---|
| | k | A4 | A6 | A8 | A10 | A12 |
| R3 | −1.5573E+00 | −6.3405E−03 | −1.4399E−03 | −6.2927E−03 | 1.0956E−02 | −8.2678E−03 |
| R4 | 1.1234E+02 | 1.5055E−04 | −1.6642E−02 | 2.3673E−02 | −1.9474E−02 | 9.9161E−03 |
| R13 | −7.7080E−03 | 7.1035E−04 | −4.6963E−04 | 1.2993E−04 | −2.1571E−05 | 1.8278E−06 |
| R14 | 1.1514E+01 | −4.7822E−03 | −2.3741E−04 | 5.9256E−05 | −5.7466E−06 | −3.3915E−07 |

| | Conic coefficients | Aspheric surface coefficients | | | | |
|---|---|---|---|---|---|---|
| | k | A14 | A16 | A18 | A20 | A22 |
| R3 | −1.5573E+00 | 3.4433E−03 | −8.1542E−04 | 1.0256E−04 | −5.3078E−06 | / |
| R4 | 1.1234E+02 | −3.1550E−03 | 6.1053E−04 | −6.5736E−05 | 3.0198E−06 | / |
| R13 | −7.7080E−03 | −2.2763E−08 | −6.9127E−09 | 3.4291E−10 | / | / |
| R14 | 1.1514E+01 | 1.7632E−07 | −2.2004E−08 | 1.3670E−09 | −4.3299E−11 | 5.5824E−13 |

Figure 6:
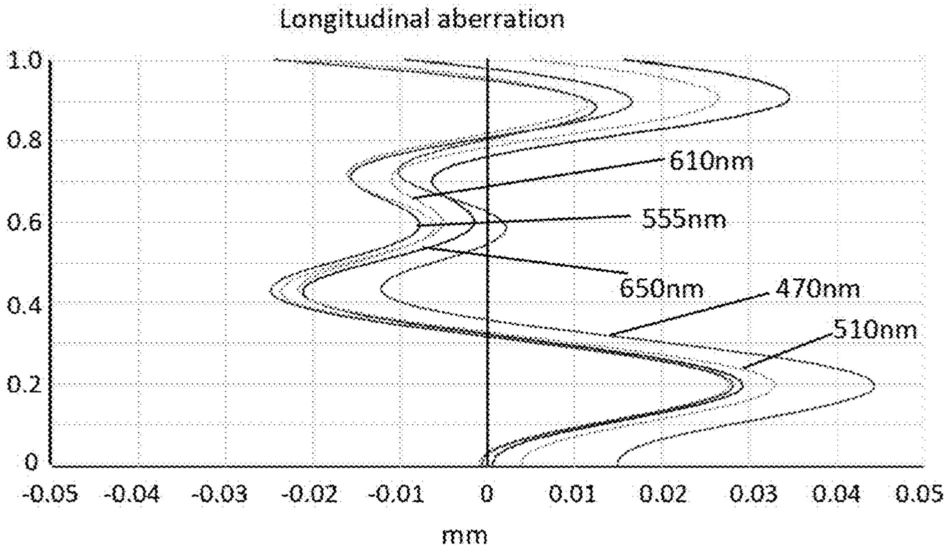
FIG. 6 shows the longitudinal aberration of the camera optical lens shown in FIG. 5.
Figure 7:
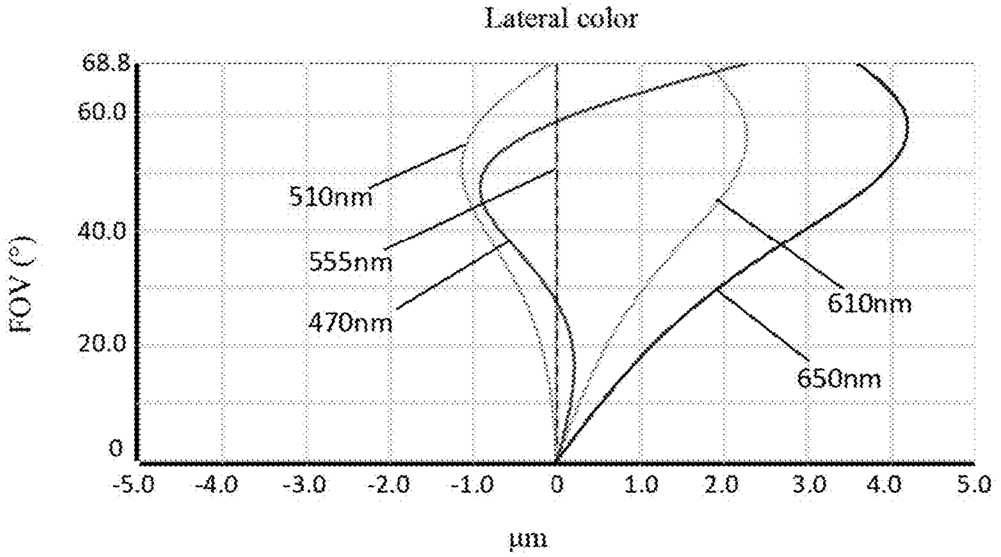
FIG. 7 shows the lateral color of the camera optical lens shown in in FIG. 5.
Figure 8:
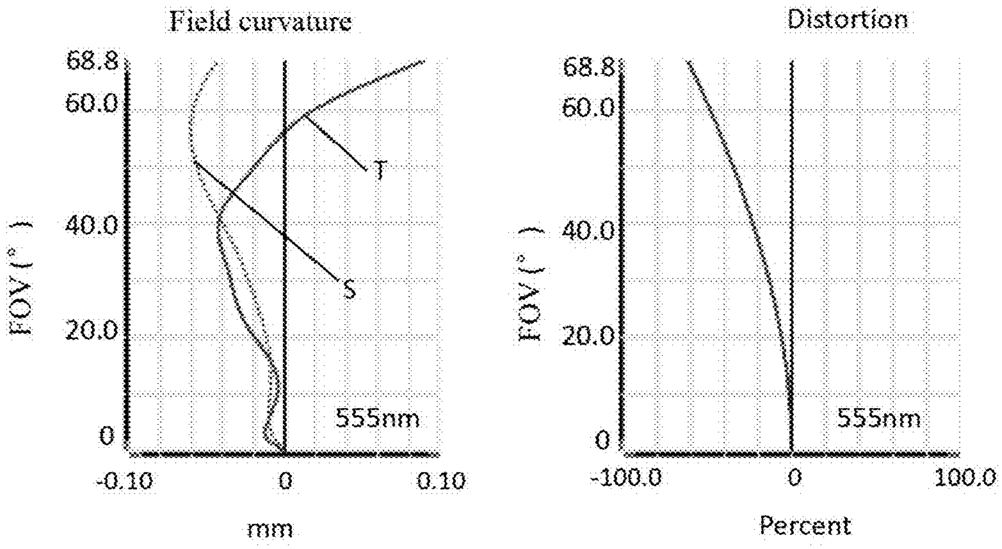
FIG. 8 presents a schematic diagram of the field curvature and distortion of the camera optical lens shown in FIG. 5.

FIG. 6 and FIG. 7 respectively show the longitudinal aberration and lateral color schematic diagrams after light with wavelengths of 650 nm, 610 nm, 555 nm, 510 nm, and 470 nm passes through the camera optical lens 20 in the second embodiment. FIG. 8 shows the schematic diagrams of the field curvature and distortion after light with a wavelength of 555 nm passes through the camera optical lens 20 in the second implementation. The field curvature S in FIG. 8 is a field curvature in the sagittal direction, and T is the field curvature in the meridian direction.

In this embodiment, the pupil entering diameter (ENPD) of the camera optical lens 20 is 2.191 mm, the image height (IH) of 1.0H is 4.399 mm, and the field of view (FOV) in the diagonal direction is 137.62°. The camera optical lens 20 can meet the design requirements of large aperture and wide-angle, and chromatic aberrations on-axis and chromatic aberrations off-axis are adequately corrected. And the camera optical lens 20 has excellent optical characteristics.

Third Embodiment

The meaning of symbols in the third embodiment is the same as that in the first embodiment.

Figure 9:
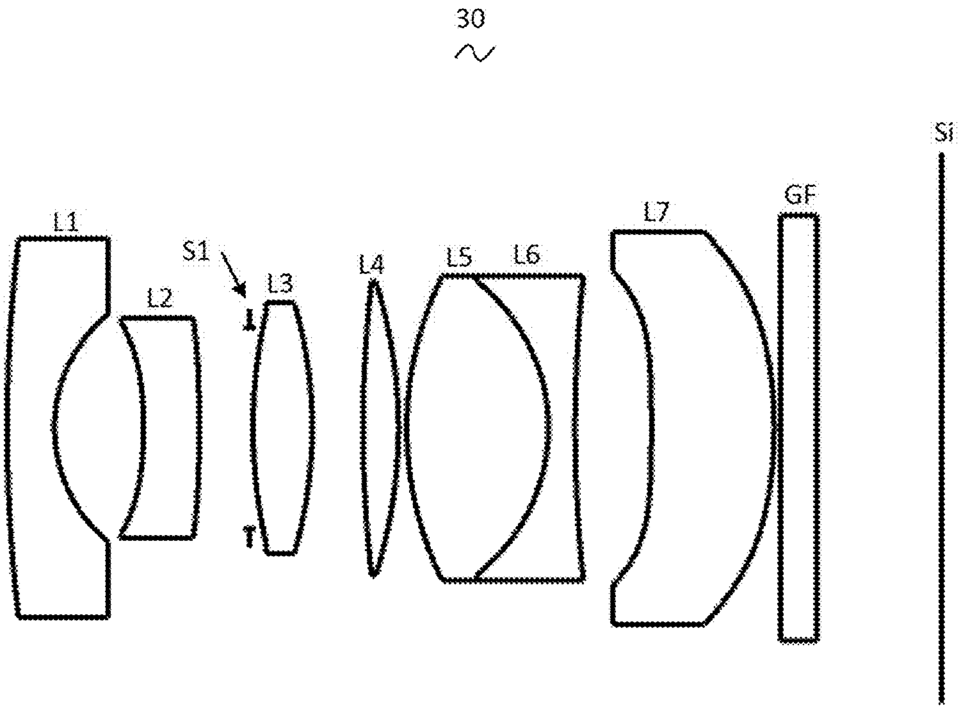
FIG. 9 is a schematic diagram of a camera optical lens in accordance with a third embodiment of the present disclosure.

FIG. 9 shows the camera optical lens 30 in the third embodiment of the present disclosure.

The object side surface of the first lens L1 is convex in the paraxial region. The object side surface of the seventh lens L7 is concave in the paraxial region.

Table 5 and table 6 show the design data of the camera optical lens 30 in the third embodiment of the present disclosure.

TABLE 5

| | R | d | | nd | | vd | |
|---|---|---|---|---|---|---|---|
| S1 | ∞ | d0= | −4.642 | | | | |
| R1 | 31.713 | d1= | 0.905 | nd1 | 1.5891 | v1 | 61.25 |
| R2 | 2.979 | d2= | 1.708 | | | | |

TABLE 5-continued

| | R | d | | nd | | vd | |
|---|---|---|---|---|---|---|---|
| R3 | −8.044 | d3= | 1.058 | nd2 | 1.8100 | v2 | 41.00 |
| R4 | −72.880 | d4= | 1.037 | | | | |
| R5 | 10.465 | d5= | 1.132 | nd3 | 1.7725 | v3 | 49.61 |
| R6 | −9.011 | d6= | 0.976 | | | | |
| R7 | 25.627 | d7= | 0.675 | nd4 | 1.5891 | v4 | 61.25 |
| R8 | −9.851 | d8= | 0.162 | | | | |
| R9 | 6.944 | d9= | 2.723 | nd5 | 1.5639 | v5 | 60.79 |
| R10 | −3.733 | d10= | 0.000 | | | | |
| R11 | −3.733 | d11= | 0.514 | nd6 | 1.7847 | v6 | 25.72 |
| R12 | 28.800 | d12= | 1.457 | | | | |
| R13 | −63.939 | d13= | 2.351 | nd7 | 1.5891 | v7 | 61.16 |
| R14 | −8.719 | d14= | 0.124 | | | | |
| R15 | ∞ | d15= | 0.700 | ndg | 1.5168 | vg | 64.21 |
| R16 | ∞ | d16= | 2.385 | | | | |

Table 6 shows aspherical surface data of the second lens L2 and the seventh lens L7 of the camera optical lens 30 in the third embodiment of the present disclosure.

TABLE 6

| | Conic coefficients | Aspheric surface coefficients | | | | |
|---|---|---|---|---|---|---|
| | k | A4 | A6 | A8 | A10 | A12 |
| R3 | −2.5474E+00 | −7.8801E−03 | −5.0649E−03 | 7.8441E−03 | −6.8856E−03 | 3.4036E−03 |
| R4 | −6.9924E+01 | −6.0269E−03 | 5.1905E−03 | −1.3157E−02 | 1.5778E−02 | −1.0188E−02 |

TABLE 6-continued

| | | | | | | |
|---|---|---|---|---|---|---|
| R13 | −6.7702E+03 | −1.0350E−02 | 3.8277E−03 | −2.3766E−03 | 8.7103E−04 | −2.0063E−04 |
| R14 | −5.7982E+00 | 1.8607E−04 | −1.6630E−03 | 4.4608E−04 | −6.9673E−05 | 5.9909E−06 |

| | Conic coefficients | Aspheric surface coefficients | | | | |
|---|---|---|---|---|---|---|
| | k | A14 | A16 | A18 | A20 | A22 |
| R3 | −2.5474E+00 | −9.0337E−04 | 1.1100E−04 | −2.3393E−06 | −4.3346E−07 | / |
| R4 | −6.9924E+01 | 3.8194E−03 | −8.3388E−04 | 9.8514E−05 | −4.8742E−06 | / |
| R13 | −6.7702E+03 | 2.9093E−05 | −2.5753E−06 | 1.2723E−07 | −2.6902E−09 | / |
| R14 | −5.7982E+00 | −2.0766E−07 | −6.1416E−09 | 7.2531E−10 | −1.6717E−11 | / |

Figure 10:
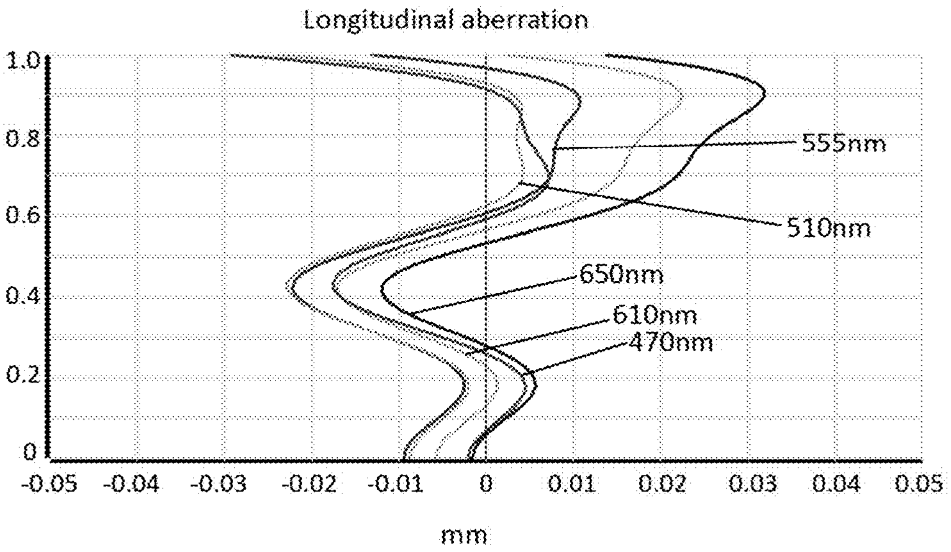
FIG. 10 shows the longitudinal aberration of the camera optical lens shown in FIG. 9.
Figure 11:
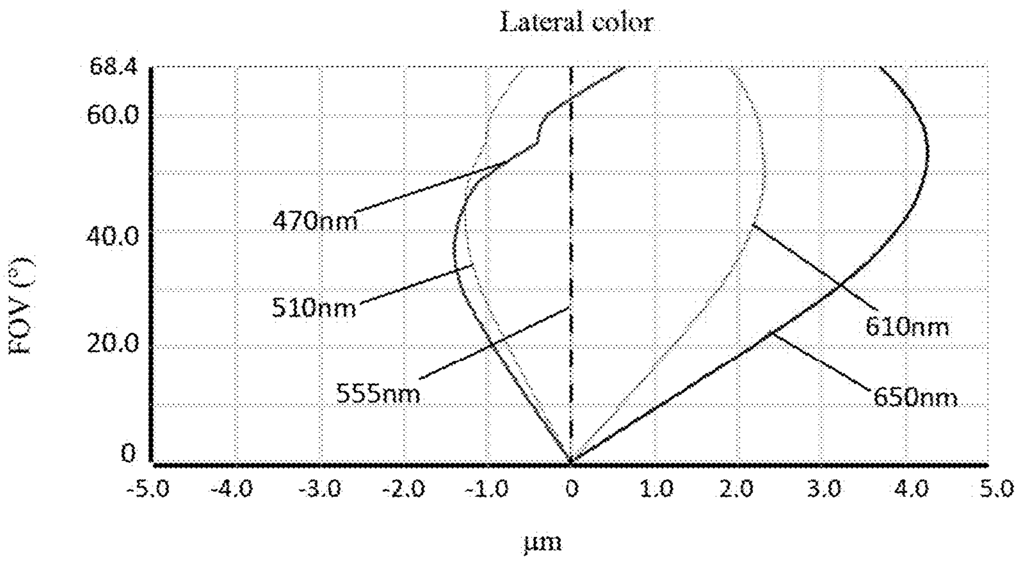
FIG. 11 shows the lateral color of the camera optical lens shown in in FIG. 9.
Figure 12:
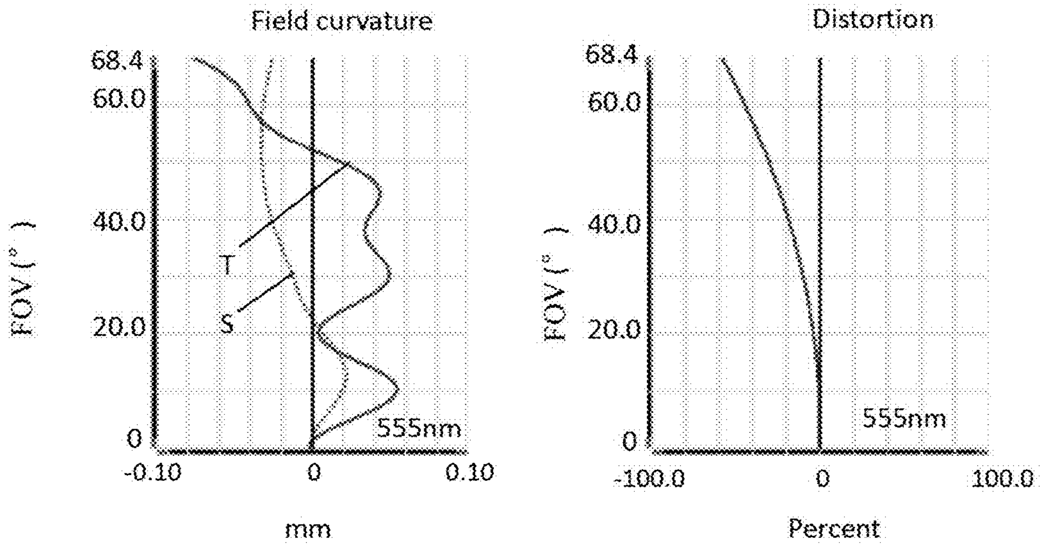
FIG. 12 presents a schematic diagram of the field curvature and distortion of the camera optical lens shown in FIG. 9.

FIG. 10 and FIG. 11 respectively show the longitudinal aberration and lateral color schematic diagrams after light with wavelengths of 650 nm, 610 nm, 555 nm, 510 nm, and 470 nm passes through the camera optical lens 30 in the third embodiment. FIG. 12 shows the schematic diagrams of the field curvature and distortion after light with a wavelength of 555 nm passes through the camera optical lens 30 in the third embodiment. The field curvature S in FIG. 12 is a field curvature in the sagittal direction, and T is the field curvature in the meridian direction.

In this embodiment, the pupil entering diameter (ENPD) of the camera optical lens 30 is 2.128 mm, the image height (IH) of 1.0H is 4.591 mm, and the field of view (FOV) in the diagonal direction is 136.73°. The camera optical lens 30 can meet the design requirements of large aperture and wide-angle, and chromatic aberrations on-axis and chromatic aberrations off-axis are adequately corrected. And the camera optical lens 30 has excellent optical characteristics.

Fourth Embodiment

The meaning of symbols in the fourth embodiment is the same as that in the first embodiment.

TABLE 7

| | R | d | | nd | | vd | |
|---|---|---|---|---|---|---|---|
| S1 | ∞ | d0= | −4.217 | | | | |
| R1 | 33.712 | d1= | 0.292 | nd1 | 1.5891 | v1 | 61.25 |
| R2 | 2.606 | d2= | 2.211 | | | | |
| R3 | −8.161 | d3= | 1.039 | nd2 | 1.8100 | v2 | 41.00 |
| R4 | −47.178 | d4= | 0.594 | | | | |
| R5 | 9.468 | d5= | 1.843 | nd3 | 1.7725 | v3 | 49.61 |
| R6 | −9.031 | d6= | 0.446 | | | | |
| R7 | 21.715 | d7= | 0.651 | nd4 | 1.5891 | v4 | 61.25 |
| R8 | −9.458 | d8= | 0.081 | | | | |
| R9 | 6.170 | d9= | 2.667 | nd5 | 1.4970 | v5 | 81.59 |
| R10 | −3.626 | d10= | 0.000 | | | | |
| R11 | −3.626 | d11= | 0.857 | nd6 | 1.7847 | v6 | 25.72 |
| R12 | 58.780 | d12= | 1.327 | | | | |
| R13 | 47.390 | d13= | 1.648 | nd7 | 1.5891 | v7 | 61.16 |
| R14 | −16.421 | d14= | 0.246 | | | | |
| R15 | ∞ | d15= | 0.700 | ndg | 1.5168 | vg | 64.21 |
| R16 | ∞ | d16= | 2.454 | | | | |

Table 8 shows aspherical surface data of the second lens L2 and the seventh lens L7 of the camera optical lens 40 in the fourth embodiment of the present disclosure.

TABLE 8

| | Conic coefficients | Aspheric surface coefficients | | | | |
|---|---|---|---|---|---|---|
| | k | A4 | A6 | A8 | A10 | A12 |
| R3 | −2.5922E+00 | −1.1444E−02 | 5.6580E−03 | −8.9747E−03 | 8.3336E−03 | −4.6476E−03 |
| R4 | −4.8797E+01 | −9.0279E−03 | 8.4238E−03 | −1.0562E−02 | 7.9239E−03 | −3.5783E−03 |
| R13 | −1.0134E−02 | 1.5688E−03 | −1.4632E−03 | 7.1795E−04 | −2.1312E−04 | 3.8351E−05 |
| R14 | −1.5903E+01 | −4.2857E−03 | −1.4331E−03 | 1.0626E−03 | −4.7449E−04 | 1.3591E−04 |

| | Conic coefficients | Aspheric surface coefficients | | | | |
|---|---|---|---|---|---|---|
| | k | A14 | A16 | A18 | A20 | A22 |
| R3 | −2.5922E+00 | 1.5881E−03 | −3.2686E−04 | 3.7318E−05 | −1.8200E−06 | / |
| R4 | −4.8797E+01 | 9.8526E−04 | −1.6056E−04 | 1.4045E−05 | −4.9724E−07 | / |
| R13 | −1.0134E−02 | −4.0091E−06 | 2.2231E−07 | −5.0340E−09 | / | / |
| R14 | −1.5903E+01 | −2.5000E−05 | 2.9222E−06 | −2.0808E−07 | 8.1753E−09 | −1.3524E−10 |

Figure 13:
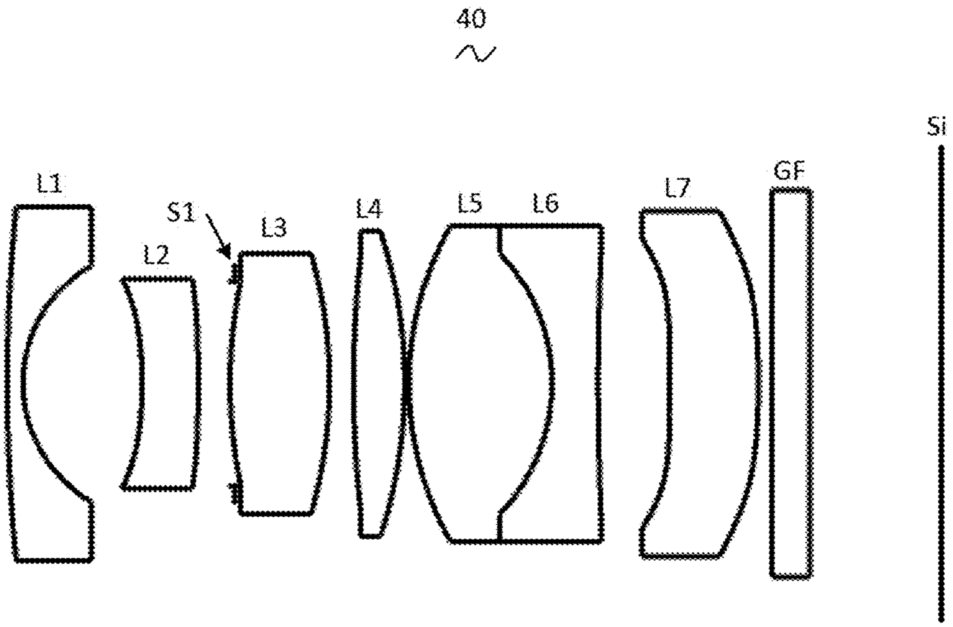
FIG. 13 is a schematic diagram of a camera optical lens in accordance with a fourth embodiment of the present disclosure.

FIG. 13 shows the camera optical lens 40 in the fourth embodiment of the present disclosure.

The object side surface of the first lens L1 is convex in the paraxial region. The object side surface of the seventh lens L7 is convex in the paraxial region.

Table 7 and table 8 show the design data of the camera optical lens 40 in the fourth embodiment of the present disclosure.

Figure 14:
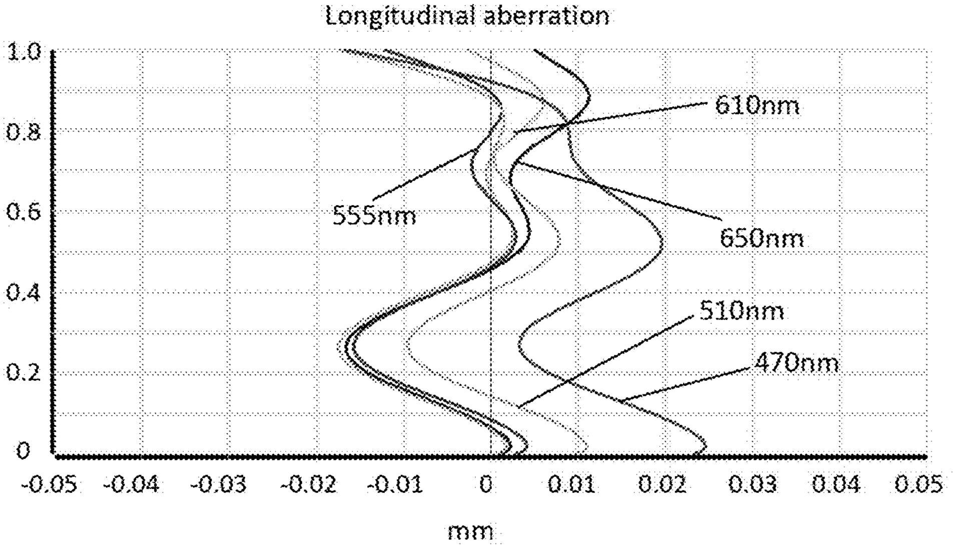
FIG. 14 shows the longitudinal aberration of the camera optical lens shown in FIG. 13.
Figure 15:
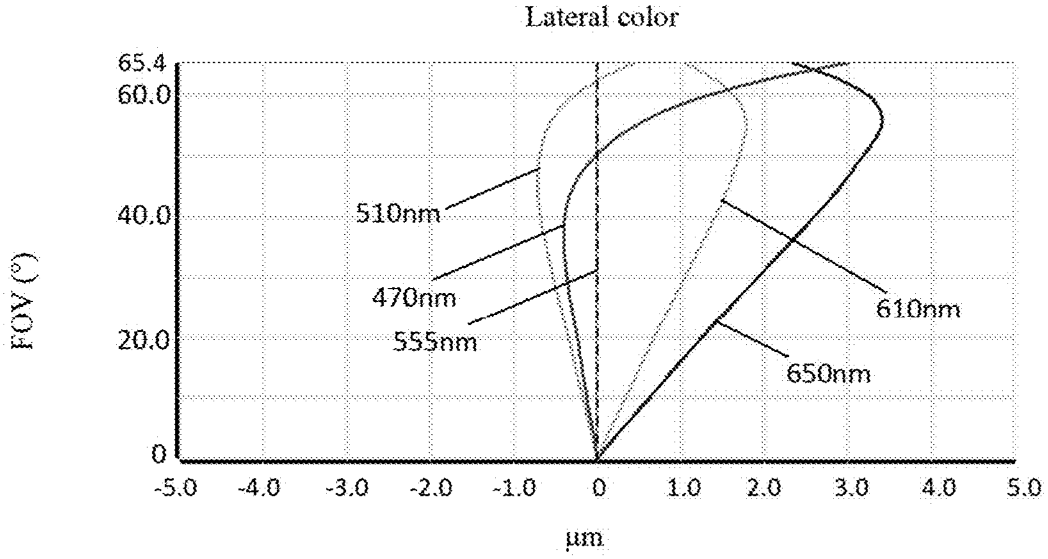
FIG. 15 shows the lateral color of the camera optical lens shown in FIG. 13.
Figure 16:
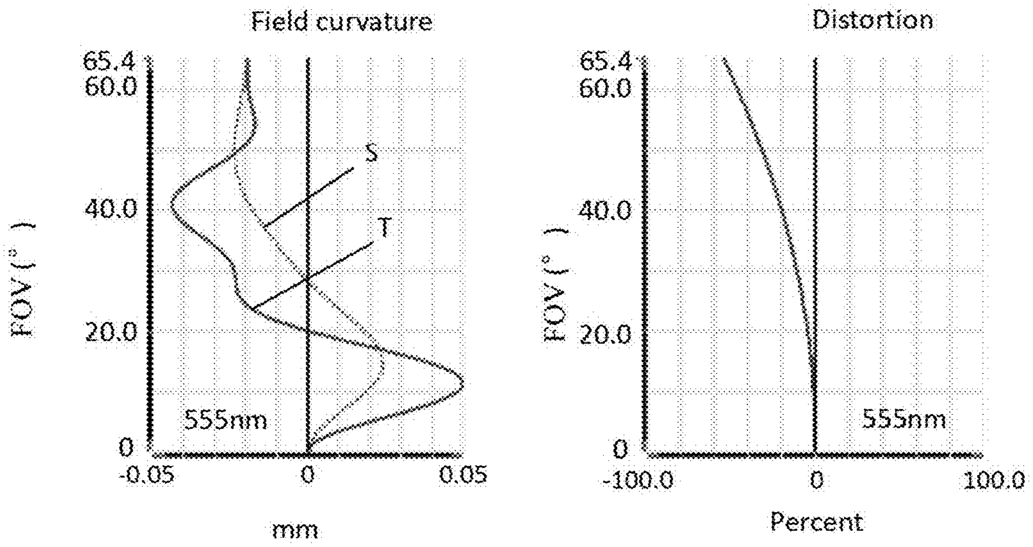
FIG. 16 presents a schematic diagram of the field curvature and distortion of the camera optical lens shown in FIG. 13.

FIG. 14 and FIG. 15 respectively show the longitudinal aberration and lateral color schematic diagrams after light with wavelengths of 650 nm, 610 nm, 555 nm, 510 nm, and 470 nm passes through the camera optical lens 40 in the fourth embodiment. FIG. 16 shows the schematic diagrams of the field curvature and distortion after light with a wavelength of 555 nm passes through the camera optical lens 40 in the fourth embodiment. The field curvature S in FIG. 16 is a field curvature in the sagittal direction, and T is the field curvature in the meridian direction.

In this embodiment, the pupil entering diameter (ENPD) of the camera optical lens 40 is 1.93 mm, the image height (IH) of 1.0H is 4.468 mm, and the field of view (FOV) in the diagonal direction is 130.84°. The camera optical lens 40 can meet the design requirements of large aperture and wide-angle, and chromatic aberrations on-axis and chromatic aberrations off-axis are adequately corrected. And the camera optical lens 40 has excellent optical characteristics.

As shown in table 11, which appears later, the values corresponding with the parameters in the first embodiment, the second embodiment, the third embodiment, and the fourth embodiment are fixed in the conditions.

Contrast Embodiment

The meaning of symbols in the contrast embodiment is the same as that in the first embodiment.

Figure 17:
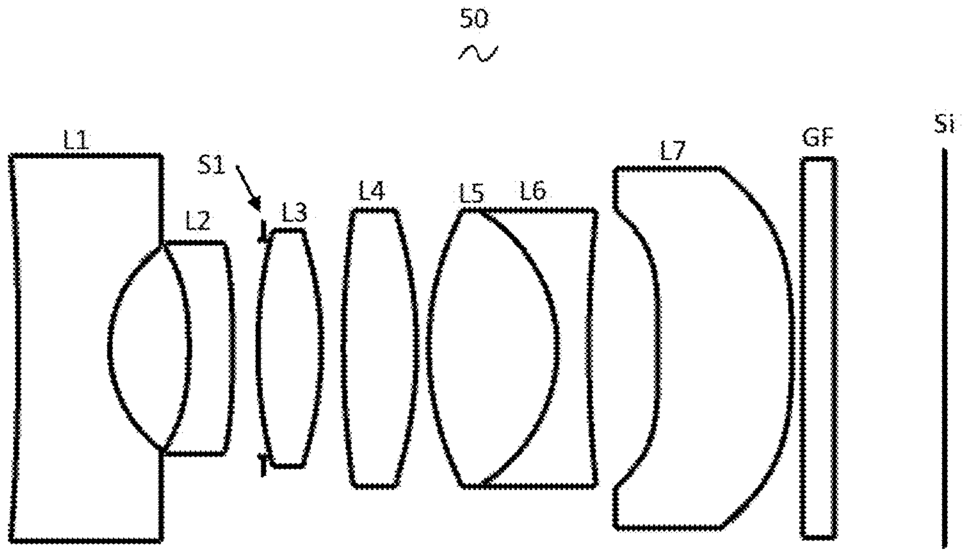
FIG. 17 is a schematic diagram of a camera optical lens in accordance with a comparative embodiment of the present disclosure.

FIG. 17 shows the camera optical lens 50 in the contrast embodiment.

The object side surface of the first lens L1 is concave in the paraxial region. The object side surface of the seventh lens L7 is concave in the paraxial region.

Table 9 and table 10 show the design data of the camera optical lens 50 in the contrast embodiment.

TABLE 9

| | R | | d | | nd | | vd |
|---|---|---|---|---|---|---|---|
| S1 | ∞ | d0= | −5.373 | | | | |
| R1 | −55.699 | d1= | 2.001 | nd1 | 1.5891 | v1 | 61.25 |
| R2 | 2.851 | d2= | 1.734 | | | | |
| R3 | −8.145 | d3= | 0.953 | nd2 | 1.8100 | v2 | 41.00 |
| R4 | −55.727 | d4= | 0.554 | | | | |
| R5 | 10.680 | d5= | 1.386 | nd3 | 1.7725 | v3 | 49.61 |
| R6 | −8.445 | d6= | 0.487 | | | | |
| R7 | 21.903 | d7= | 1.599 | nd4 | 1.5891 | v4 | 61.25 |
| R8 | −10.083 | d8= | 0.271 | | | | |
| R9 | 6.785 | d9= | 2.823 | nd5 | 1.5928 | v5 | 68.35 |
| R10 | −3.603 | d10= | 0.000 | | | | |
| R11 | −3.603 | d11= | 0.691 | nd6 | 1.7847 | v6 | 25.72 |
| R12 | 29.222 | d12= | 1.515 | | | | |
| R13 | −76.806 | d13= | 2.936 | nd7 | 1.5891 | v7 | 61.16 |
| R14 | −19.730 | d14= | 0.225 | | | | |
| R15 | ∞ | d15= | 0.700 | ndg | 1.5168 | vg | 64.21 |
| R16 | ∞ | d16= | 2.416 | | | | |

Table 10 shows aspherical surface data of the second lens L2 and the seventh lens L7 of the camera optical lens 50 in the contrast embodiment.

TABLE 10

| | Conic coefficients | Aspheric surface coefficients | | | | |
|---|---|---|---|---|---|---|
| | k | A4 | A6 | A8 | A10 | A12 |
| R3 | −1.6311E+00 | −2.2866E−03 | −1.7002E−02 | 1.5775E−02 | −6.6816E−03 | 8.1778E−04 |
| R4 | 1.2176E+02 | −5.3236E−03 | −3.6771E−03 | 6.7016E−03 | −5.8538E−03 | 2.9835E−03 |
| R13 | 6.6028E+01 | −6.3592E−04 | −8.5887E−03 | 5.4286E−03 | −2.1621E−03 | 5.4055E−04 |
| R14 | 1.1005E+01 | −5.3457E−03 | 2.0403E−04 | −1.2930E−04 | 5.2320E−05 | −1.2281E−05 |

| | Conic coefficients | Aspheric surface coefficients | | | | |
|---|---|---|---|---|---|---|
| | k | A14 | A16 | A18 | A20 | A22 |
| R3 | −1.6311E+00 | 3.6166E−04 | −1.5709E−04 | 2.3333E−05 | −1.2549E−06 | / |
| R4 | 1.2176E+02 | −9.1188E−04 | 1.6444E−04 | −1.6121E−05 | 6.6229E−07 | / |
| R13 | 6.6028E+01 | −8.4622E−05 | 8.0058E−06 | −4.1679E−07 | 9.1540E−09 | / |
| R14 | 1.1005E+01 | 1.8139E−06 | −1.6992E−07 | 9.7276E−09 | −3.0881E−10 | 4.1537E−12 |

Figure 18:
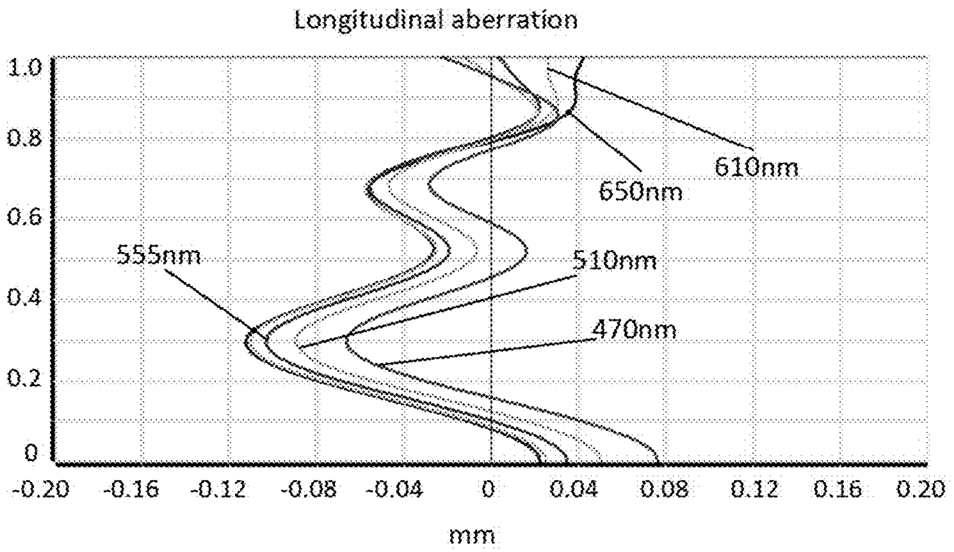
FIG. 18 shows the longitudinal aberration of the camera optical lens shown in FIG. 17.
Figure 19:
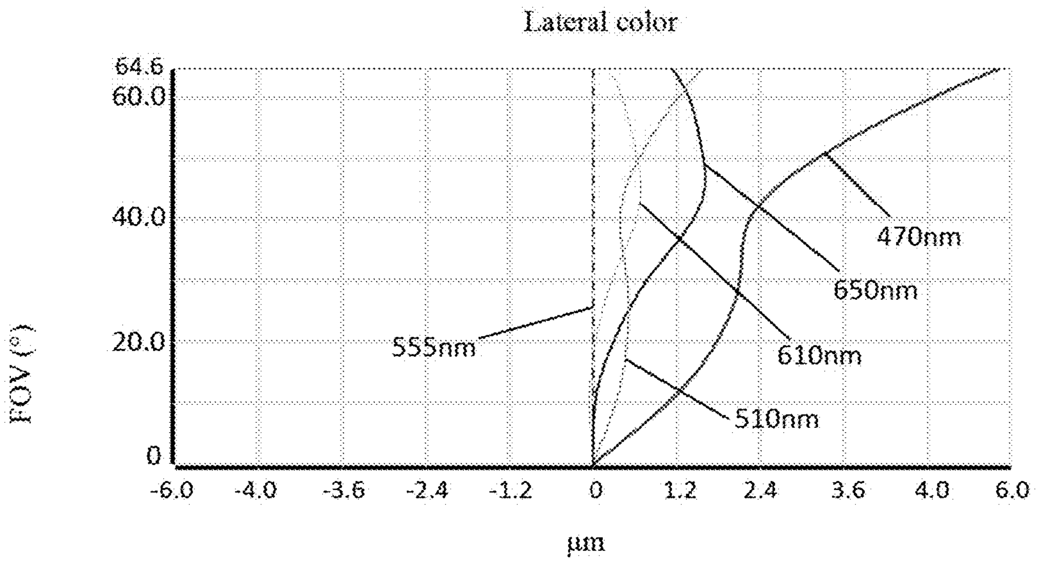
FIG. 19 shows the lateral color of the camera optical lens shown in FIG. 17.
Figure 20:
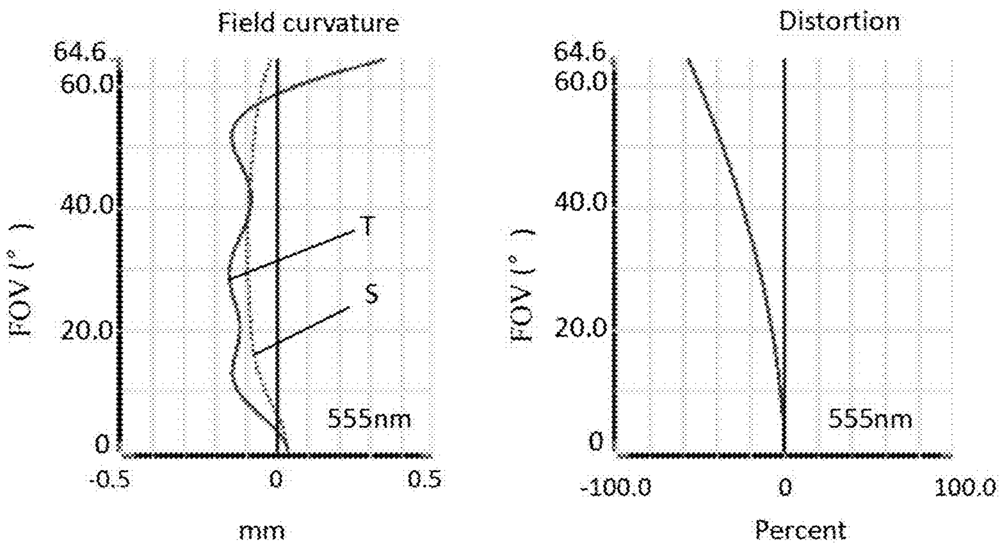
FIG. 20 presents a schematic diagram of the field curvature and distortion of the camera optical lens shown in FIG. 17.

FIG. 18 and FIG. 19 respectively show the longitudinal aberration and lateral color schematic diagrams after light with wavelengths of 650 nm, 610 nm, 555 nm, 510 nm, and 470 nm passes through the camera optical lens 50 in the contrast embodiment. FIG. 20 shows the schematic diagrams of the field curvature and distortion after light with a wavelength of 555 nm passes through the camera optical lens 60 in the contrast embodiment. The field curvature S in FIG. 20 is a field curvature in the sagittal direction, and T is the field curvature in the meridian direction.

Table 11 below shows the various values in this embodiment in accordance with the above conditions. Obviously, the camera optical lens 50 in this embodiment does not satisfy the above condition:—1.3≤f1/f≤1, which has poor image performance.

In the contrast embodiment, the pupil entering diameter (ENPD) of the camera optical lens 50 is 2.405 mm, the image height (IH) of 1.0H is 4.400 mm, and the field of view (FOV) in the diagonal direction is 129.20°. The camera optical lens 50 does not meet the design requirements of large aperture, wide-angle and ultra-thin.

TABLE 11

| Parameters and conditions | First Embodiment | Second Embodiment | Third Embodiment | Fourth Embodiment | Contrast Embodiment |
|---|---|---|---|---|---|
| f1/f | −1.154 | −1.001 | −1.297 | −1.218 | −0.924 |
| d4/TTL | 0.035 | 0.020 | 0.058 | 0.035 | 0.027 |
| n2 | 1.810 | 1.702 | 1.810 | 1.810 | 1.810 |
| BFL/TTL | 0.167 | 0.101 | 0.179 | 0.199 | 0.165 |
| f | 4.305 | 4.469 | 4.342 | 3.937 | 4.906 |
| f1 | −4.969 | −4.474 | −5.630 | −4.797 | −4.532 |
| f2 | −11.615 | −14.659 | −11.196 | −12.276 | −11.831 |
| f3 | 6.293 | 6.225 | 6.408 | 6.233 | 6.281 |
| f4 | 11.829 | 11.592 | 12.128 | 11.237 | 11.906 |
| f5 | 4.432 | 4.396 | 4.729 | 5.041 | 4.405 |
| f6 | −4.071 | −4.137 | −4.154 | −4.296 | −4.022 |
| f7 | 34.872 | 64.278 | 16.820 | 20.839 | 44.089 |
| FNO | 2.040 | 2.040 | 2.040 | 2.040 | 2.040 |
| TTL | 18.000 | 19.229 | 17.907 | 17.056 | 20.291 |

It can be understood by a person of ordinary skill in the art that the above embodiments are specific embodiments of the realization of the present disclosure, and that various changes can be made thereto in form and detail in practical application without departing from the spirit and scope of the present disclosure.

What is claimed is:

1. A camera optical lens, comprising seven lenses, from an object side to an image side, the seven lenses in sequence being:

a first lens having a negative refractive power;

a second lens having a negative refractive power;

a third lens having a positive refractive power;

a fourth lens having a positive refractive power;

a fifth lens having a positive refractive power;

a sixth lens having a negative refractive power;

a seventh lens having a positive refractive power;

wherein the camera lens satisfies the following conditions:

$$-1.30 \leq f1/f \leq -1.00;$$

$$0.02 \leq d4/TTL \leq 0.06;$$

$$n2 \geq 1.70;$$

$$0.10 \leq BFL/TTL \leq 0.30;$$

where, f represents a focal length of the camera optical lens;

f1 represents a focal length of the first lens;

d4 represents a distance on axis between an image side surface of the second lens and an object side surface of the third lens;

TTL represents a total track length of the camera optical lens;

nd2 represents a refractive index of the second lens;

BFL represents a distance on axis between an image side surface of the seventh lens and an image surface.

2. The camera optical lens according to claim 1, wherein the fifth lens is provided glued to the sixth lens.

3. The camera optical lens according to claim 2, wherein the camera optical lens further satisfies the following conditions:

$$v5 - v6 \geq 35.00;$$

where, v5 represents an abbe number of the fifth lens;

v6 represents an abbe number of the sixth lens.

4. The camera optical lens according to claim 1, wherein the camera optical lens further satisfies the following conditions:

$$-8.00 \leq R14/f \leq -2.00;$$

where,

R14 represents a central curvature radius of the image side surface of the seventh lens.

5. The camera optical lens according to claim 1, wherein an image side surface of the first lens is concave in a paraxial region; and the camera optical lens further satisfies the following conditions:

$$0.47 \leq (R1 + R2)/(R1 - R2) \leq 1.81;$$

$$0.01 \leq d1/TTL \leq 0.14;$$

where,

R1 represents a central curvature radius of the object side surface of the first lens;

R2 represents a central curvature radius of the image side surface of the first lens;

d1 represents a thickness on-axis of the first lens.

6. The camera optical lens according to claim 1, wherein an object side surface of the second lens is concave in a paraxial region, an image side surface of the second lens is convex in a paraxial region; and the camera optical lens further satisfies the following conditions:

$$-6.56 \leq f2/f \leq -1.72;$$

$$-2.84 \leq (R3 + R4)/(R3 - R4) \leq -0.83;$$

$$0.03 \leq d3/TTL \leq 0.09;$$

where, f2 represents a focal length of the second lens;

R3 represents a central curvature radius of the object side surface of the second lens;

R4 represents a central curvature radius of the image side surface of the second lens;

d3 represents a thickness on-axis of the second lens.

7. The camera optical lens according to claim 1, wherein an object side surface of the third lens is convex in a paraxial region, an image side surface of the third lens is convex in a paraxial region; and the camera optical lens further satisfies the following conditions:

$$0.70 \leq f3/f \leq 2.37;$$

$$0.01 \leq (R5 + R6)/(R5 - R6) \leq 0.23;$$

$$0.03 \leq d5/TTL \leq 0.16;$$

where, f3 represents a focal length of the third lens;

R5 represents a central curvature radius of the object side surface of the third lens;

R6 represents a central curvature radius of the image side surface of the third lens;

d5 represents a thickness on-axis of the third lens.

8. The camera optical lens according to claim 1, wherein an object side surface of the fourth lens is convex in a paraxial region, an image side surface of the fourth lens is convex in a paraxial region; and the camera optical lens further satisfies the following conditions:

$$1.30 \leq f4/f \leq 4.28;$$

$$0.20 \leq (R7 + R8)/(R7 - R8) \leq 0.79;$$

$$0.02 \leq d7/TTL \leq 0.13;$$

where, f4 represents a focal length of the fourth lens;

R7 represents a central curvature radius of the object side surface of the fourth lens;

R8 represents a central curvature radius of the image side surface of the fourth lens;

d7 represents a thickness on-axis of the fourth lens.

9. The camera optical lens according to claim 1, wherein an object side surface of the fifth lens is convex in a paraxial region, an image side surface of the fifth lens is convex in a paraxial region; and the camera optical lens further satisfies the following conditions:

$$0.49 \leq f5/f \leq 1.92;$$

$$0.13 \leq (R9+R10)/(R9-R10) \leq 0.45;$$

$$0.07 \leq d9/TTL \leq 0.23;$$

where, f5 represents a focal length of the fifth lens;

R9 represents a central curvature radius of the object side surface of the fifth lens;

R10 represents a central curvature radius of the image side surface of the fifth lens;

d9 represents a thickness on-axis of the fifth lens.

10. The camera optical lens according to claim 1, wherein an object side surface of the sixth lens is concave in a paraxial region, an image side surface of the sixth lens is concave in a paraxial region; and the camera optical lens further satisfies the following conditions:

$$-2.18 \leq f6/f \leq -0.62;$$

$$-1.77 \leq (R11+R12)/(R11-R12) \leq -0.51;$$

$$0.01 \leq d11/TTL \leq 0.08;$$

where, f6 represents a focal length of the sixth lens;

R11 represents a central curvature radius of the object side surface of the sixth lens;

R12 represents a central curvature radius of the image side surface of the sixth lens;

d11 represents a thickness on-axis of the sixth lens.

11. The camera optical lens according to claim 1, wherein an image side surface of the seventh lens is convex in a paraxial region; and the camera optical lens further satisfies the following conditions:

$$1.94 \leq f7/f \leq 21.57;$$

$$0.24 \leq (R13+R14)/(R13-R14) \leq 1.97;$$

$$0.05 \leq d13/TTL \leq 0.28;$$

where, f7 represents a focal length of the seventh lens;

R13 represents a central curvature radius of the object side surface of the seventh lens;

R14 represents a central curvature radius of the image side surface of the seventh lens;

d13 represents a thickness on-axis of the seventh lens.

12. The camera optical lens according to claim 1, wherein the first lens is made of glass material; the second lens is made of glass material; the third lens is made of glass material;

the fourth lens is made of glass material; the fifth lens is made of glass material; the sixth lens is made of glass material; the seventh lens is made of glass material.

* * * * *